J. FINCH.
HOLDER FOR COWS' TAILS.
APPLICATION FILED JUNE 8, 1908.
929,202.
Patented July 27, 1909.
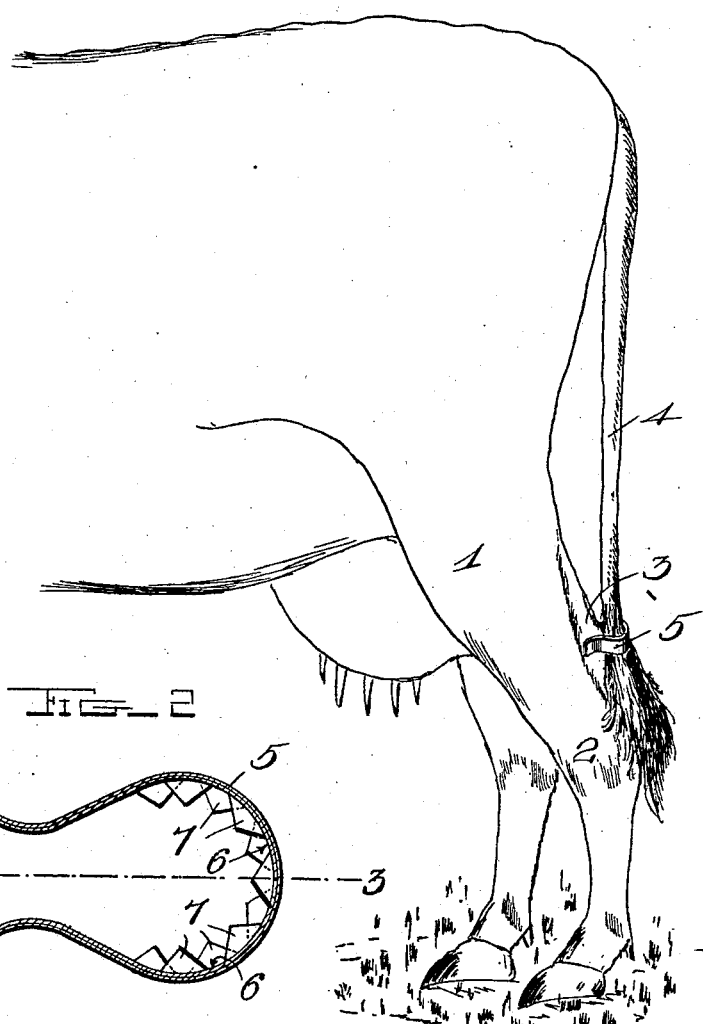
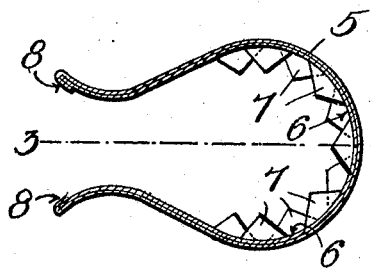
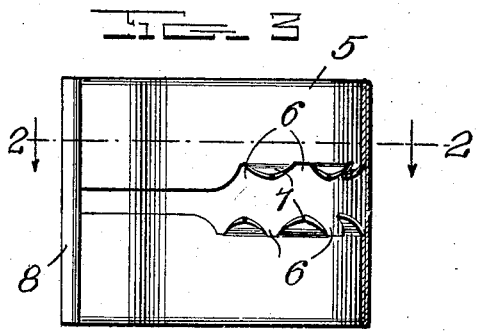
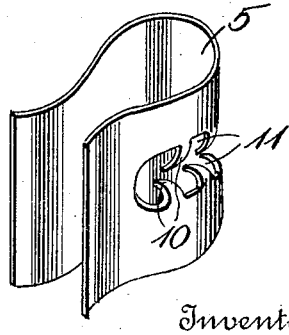
Witnesses
Inventor
James Finch
By H. B. Willson & Co.
Attorneys

UNITED STATES PATENT OFFICE.

JAMES FINCH, OF ALBION, MICHIGAN.

HOLDER FOR COWS' TAILS.

No. 929,202.      Specification of Letters Patent.      Patented July 27, 1909.

Application filed June 8, 1908. Serial No. 437,443.

*To all whom it may concern:*

Be it known that I, JAMES FINCH, a citizen of the United States, residing at Albion, in the county of Calhoun and State of Michigan, have invented certain new and useful Improvements in Holders for Cows' Tails; and I do declare the following to be a full, clear, and exact description of the invention, such as will enable others skilled in the art to which it appertains to make and use the same.

My invention relates to hopples, and particularly to that type of hopple used for holding a cow's tail when milking.

Devices of this character have been constructed in many forms, most of them having a device to surround the leg of the cow and an attachment to hold the tail to the leg. Frequently these devices were extremely annoying to the animal upon which they were placed, and most of them were comparatively expensive.

It is the object of my invention to provide a device of this character which will be simple and efficient in operation, and which will be cheap to construct.

A further object of the invention is to provide a device of this character which may be instantly applied to the leg, and broadly stated consists in a lyre-shaped member having a series of engaging teeth for holding the brush of the animal's tail.

With these and other objects in view, the invention consists of certain novel features of construction, combination and arrangement of parts, as will be more fully described and particularly pointed out in the appended claims.

In the accompanying drawings, Figure 1 shows an elevation of the device applied. Fig. 2 is a horizontal section of the device taken on the line 2—2 of Fig. 3. Fig. 3 is a vertical section taken on the line 3—3 of Fig. 2, and Fig. 4 is a perspective view of a modification.

Referring more especially to the drawings and especially to Figs. 1 and 3, 1 represents the leg of the animal, 2 the hock thereof, 3 the tendon leading therefrom, and 4 the animal's tail. The tail holder which is shown as having its constricted neck passed over the tendon in Fig. 1, and the tail clamped in the enlarged portion of the device is constructed out of a single sheet of metal 5, with its sides doubled upon itself, and notched at 6 to form the projecting prongs 7, which are shown to be separated from each other and staggered—*i. e.*—the prongs of one side are opposite the notches of the other side. The ends or flaring extensions of the body 5 are doubled over as at 8, to reinforce the ends and hold the sides properly in position.

In the modification shown in Fig. 4 the device is constructed of sheet spring steel with the prongs 10 punched therefrom so as to leave the holes 11. This latter form is the preferred form, because its manufacture is arranged considerably cheaper on account of the saving in metal, and also the simplicity of the device in manufacture, which permits its sale at a considerably lower figure than the device described in Figs. 1 and 3.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention, what I claim and desire to secure by Letters Patent is:—

1. A device of the class described comprising a single sheet of material bent to form a lyre shaped spring clip having its sides bent over upon themselves, and with spaced parallel prongs projecting inwardly from the edges of said sides, and arranged intermediate the width of the clip and in the enlarged portion only, the constricted neck being substantially uninterrupted to engage over the hock tendon of the animal and hold the tail in position thereagainst by the inherent resiliency of the clip.

2. A device of the class described comprising a single sheet of spring metal bent to form a lyre shaped clip, and a double series of inwardly projecting prongs extending from the body of the clip intermediate its width and wholly within its enlarged portion, the constricted neck being smooth and uninterrupted to engage over the hock tendon of the animal and hold the tail in position thereagainst by the inherent resiliency of the clip.

In testimony whereof I have hereunto set my hand in presence of two subscribing witnesses.

JAMES FINCH.

Witnesses:
 JOSEPH L. THOMAS,
 ARTHUR D. BAUGHAM.